United States Patent
Kodama et al.

(10) Patent No.: US 9,001,260 B2
(45) Date of Patent: Apr. 7, 2015

(54) IMAGING APPARATUS AND IMAGING METHOD

(71) Applicant: FUJIFILM Corporation, Tokyo (JP)

(72) Inventors: Kazushi Kodama, Saitama (JP); Takeshi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 117 days.

(21) Appl. No.: 13/662,639

(22) Filed: Oct. 29, 2012

(65) Prior Publication Data

US 2013/0050523 A1 Feb. 28, 2013

Related U.S. Application Data

(63) Continuation of application No. PCT/JP2011/059190, filed on Apr. 13, 2011.

(30) Foreign Application Priority Data

Apr. 30, 2010 (JP) ................................. 2010-105917

(51) Int. Cl.
*H04N 5/225* (2006.01)
*H04N 5/232* (2006.01)
(Continued)

(52) U.S. Cl.
CPC ......... *H04N 5/23212* (2013.01); *H04N 5/2253* (2013.01); *H04N 5/23219* (2013.01); *H04N 5/3696* (2013.01); *H04N 5/365* (2013.01)

(58) Field of Classification Search
CPC .. H04N 3/1587; H04N 5/23212; H04N 5/349
USPC ................................ 348/219.1, 345, 349, 351
See application file for complete search history.

(56) References Cited

U.S. PATENT DOCUMENTS 6,570,613 B1 * 5/2003 Howell ...................... 348/219.1
6,829,008 B1 12/2004 Kondo et al.
(Continued)

FOREIGN PATENT DOCUMENTS

JP 2000-156823 A 6/2000
JP 2007-027815 A 2/2007
(Continued)

OTHER PUBLICATIONS

International Search Report and English translation thereof, dated Jul. 19, 2011, for International Application No. PCT/JP2011/059190.
(Continued)

*Primary Examiner* — Timothy J Henn
(74) *Attorney, Agent, or Firm* — Birch, Stewart, Kolasch & Birch, LLP (57) ABSTRACT

An imaging apparatus includes: a solid-state imaging device having pairs of phase-difference pixels for detecting a phase difference; a position control section which changes the relative position of an imaging optical system and the solid-state imaging device; a control section which causes the solid-state imaging device to perform plural provisional imagings while changing the relative position; and a regular-imaging position determination section which determines one of the relative positions that are obtained when the provisional imagings are performed, as a relative position in regular imaging, on the basis of, among plural captured image signals which are obtained in the provisional imagings, output signals which correspond to a part or all of the pairs included in the solid-state imaging device, and which are obtained from pixels in areas including the pairs.

12 Claims, 6 Drawing Sheets

(51) Int. Cl.
*H04N 5/369* (2011.01)
*H04N 5/365* (2011.01)

(56) References Cited

U.S. PATENT DOCUMENTS

| | | | |
|---|---|---|---|
| 7,391,447 B2* | 6/2008 | Lee et al. | 348/241 |
| 7,446,811 B2* | 11/2008 | Okada | 348/357 |
| 2005/0280714 A1* | 12/2005 | Freeman | 348/219.1 |
| 2007/0013795 A1 | 1/2007 | Sakamoto et al. | |
| 2009/0096903 A1 | 4/2009 | Kusaka | |
| 2011/0109775 A1 | 5/2011 | Amano | |

FOREIGN PATENT DOCUMENTS

| | | |
|---|---|---|
| JP | 2008-211454 A | 9/2008 |
| JP | 2008-245236 | 10/2008 |
| JP | 2009-094881 A | 4/2009 |
| JP | 2009-284343 | 12/2009 |
| JP | 2010-062640 A | 3/2010 |
| JP | 2011-075677 A | 4/2011 |

OTHER PUBLICATIONS

Japanese Office Action and English translation thereof, dated Oct. 22, 2013, for Patent Application No. 2012-512763.

* cited by examiner

FIG. 6

IMAGING APPARATUS AND IMAGING METHOD

CROSS REFERENCE TO RELATED APPLICATIONS

This application is a Continuation of PCT International Application No. PCT/JP2011/059190 filed on Apr. 13, 2011, which claims priority under 35 U.S.C. §119(a) to Patent Application No. 2010-105917 filed in Japan on Apr. 30, 2010, all of which are hereby expressly incorporated by reference into the present application.

TECHNICAL FIELD

The present invention relates to an imaging apparatus and an imaging method.

BACKGROUND ART

Among solid-state imaging devices which are to be mounted in imaging apparatuses such as a digital camera and a digital video camera, there is a device which has a plurality of photoelectric converting elements (pixels) that are two-dimensionally arranged, and in which a part of the elements (two adjacent pixels on which color filters of the same color are mounted) is formed as phase-difference pixels (pixels for detecting a phase difference), and the phase-difference pixels are used for measuring a distance (for example, see Patent Document 1).

In the two adjacent phase-difference pixels, respective openings of light-shielding films are disposed so as to be offset from the optical centers of microlenses respectively disposed in the pixels, in different directions.

In each of the phase-difference pixels, when its sensitivity is not low, moreover, the phase difference is hardly detected. Therefore, the area of the opening of the light-shielding film is smaller than that of other pixels.

In such phase-difference pixels, as described above, the openings of the light-shielding films have a small area. Therefore, their output signals cannot be sufficiently used as a captured image signal because their sensitivities are insufficient. In a similar manner as in defective pixels, consequently, the output signal of a phase-difference pixel is corrected by performing an interpolation calculation by using output signals of usual pixels which are in the periphery of the phase-difference pixel.

When an edge portion such as the face or eyes of a person overlaps with phase-difference pixels, however, there is a problem in that a trace of correction which is formed as a result of the interpolation calculation of the output signals of the phase-difference pixels is conspicuous.

Patent Documents 2 and 3 below disclose methods of correcting defective pixels. In the correcting methods, after regular imaging is performed by a solid-state imaging device, correction imaging is performed while changing the position of the solid-state imaging device, and defective pixels of the image which is obtained in the regular imaging are corrected by using the image which is obtained in the correction imaging. However, the correcting methods cannot solve the above-described problem in that a trace of correction is conspicuous.

CITATION LIST

Patent Literature

Patent Document 1: JP-A-2000-156823
Patent Document 2: JP-A-2008-211454
Patent Document 3: JP-A-2008-245236

SUMMARY OF INVENTION

Technical Problem

The invention has been conducted in view of the above-discussed circumstances. It is an object of the invention to provide an imaging apparatus and imaging method which, even when an edge overlaps with phase-difference pixels, can make inconspicuous a trace of correction that is formed as a result of correction of output signals of the phase-difference pixels.

Solution to Problem

An imaging apparatus of the invention comprises a solid-state imaging device having pixels which include at least one pair of phase-difference pixels, and which are two-dimensionally arranged, in which the apparatus further comprises: an imaging optical system; a position change section which changes a relative position of the imaging optical system and the solid-state imaging device in a direction perpendicular to an optical axis of the imaging optical system; a provisional-imaging control section which causes the solid-state imaging device to perform provisional imaging a plurality of times while changing the relative position; a relative position determination section which determines one of the relative positions that are obtained when the plurality of provisional imagings are performed, as a relative position in regular imaging, on the basis of, among a plurality of captured image signals which are output from the solid-state imaging device in the plurality of provisional imagings, output signals which correspond to a part or all of the pairs included in the solid-state imaging device, and which are obtained from pixels in areas including the pairs; and a regular-imaging control section which causes the solid-state imaging device to perform regular imaging in the relative position that is determined by the relative position determination.

An imaging method of the invention uses a solid-state imaging device having pixels which include at least one pair of phase-difference pixels, and which are two-dimensionally arranged, in which the method comprises: a position changing step of changing a relative position of the imaging optical system and the solid-state imaging device in a direction perpendicular to an optical axis of the imaging optical system; a provisional-imaging controlling step of causing the solid-state imaging device to perform provisional imaging a plurality of times while changing the relative position; a relative position determining step of determining one of the relative positions that are obtained when the plurality of provisional imagings are performed, as a relative position in regular imaging, on the basis of, among a plurality of captured image signals which are output from the solid-state imaging device in the plurality of provisional imagings, output signals which correspond to a part or all of the pairs included in the solid-state imaging device, and which are obtained from pixels in areas including the pairs; and a regular-imaging controlling step of causing the solid-state imaging device to perform regular imaging in the relative position that is determined in the relative position determining.

Advantageous Effects of Invention

According to the invention, it is possible to provide an imaging apparatus and imaging method which, even when an edge overlaps with phase-difference pixels, can make inconspicuous a trace of correction that is formed as a result of correction of output signals of the phase-difference pixels.

DESCRIPTION OF EMBODIMENTS

Hereinafter, an embodiment of the invention will be described with reference to the drawings.

Figure 1:
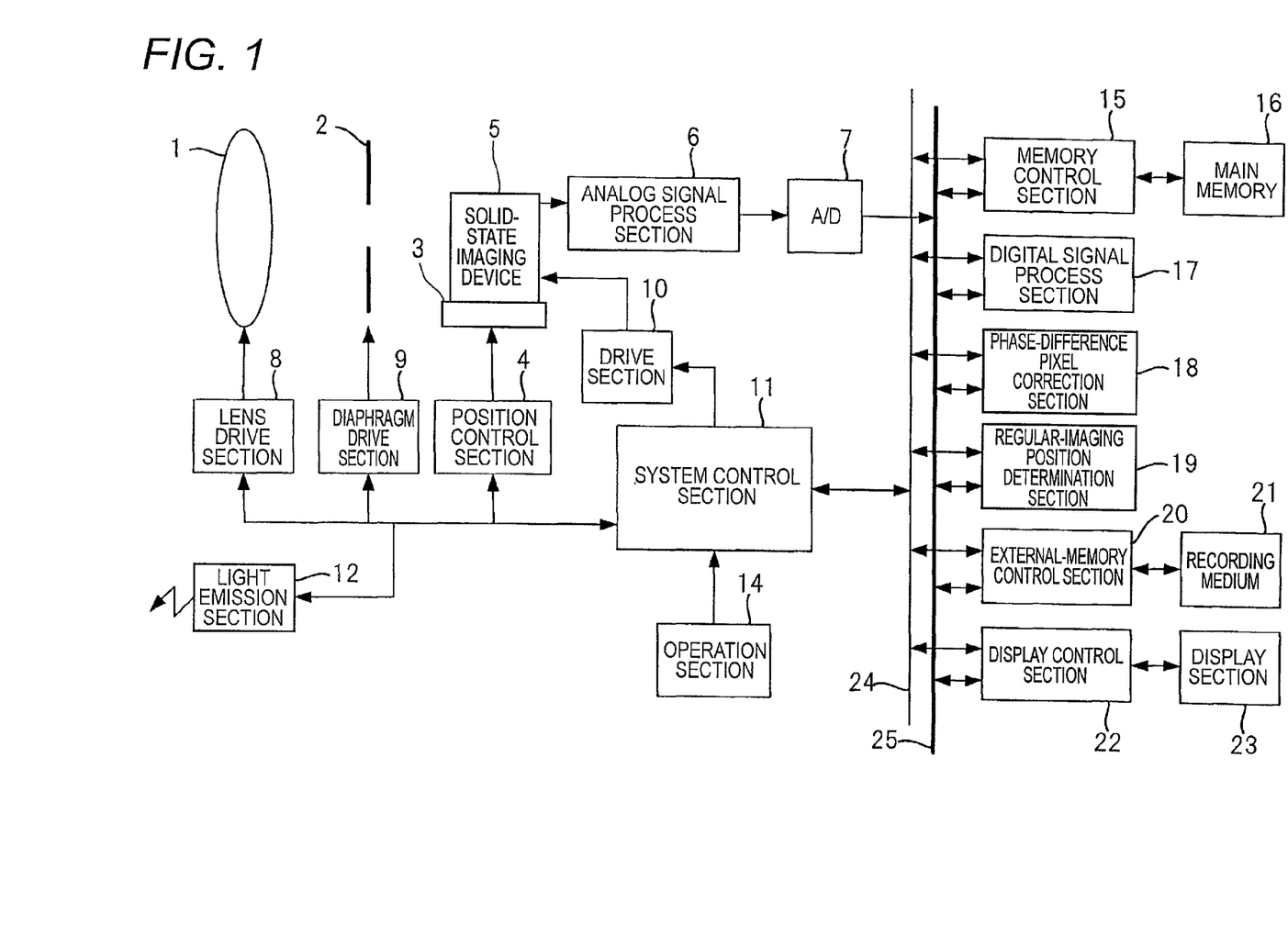
FIG. 1 is a view schematically showing the configuration of an imaging apparatus illustrating an embodiment of the invention.

FIG. 1 is a view schematically showing the configuration of an imaging apparatus illustrating an embodiment of the invention. As the imaging apparatus, there are an imaging apparatus such as a digital camera or a digital video camera, an imaging module which is to be mounted on an electronic endoscope, a camera-equipped mobile telephone, or the like, etc. Here, a digital camera will be exemplarily described.

The imaging system of the illustrated digital camera includes: an imaging optical system 1 a focusing lens, a zoom lens, and the like; a solid-state imaging device 5; a diaphragm 2 which is disposed between the two components; and a driving mechanism 3.

Although described in detail later, the solid-state imaging device 5 has a plurality of photoelectric converting elements (pixels) which are two-dimensionally arranged in a plan view, and is configured so that a part of the elements are formed as phase-difference pixels.

The driving mechanism 3 is a mechanism for moving the solid-state imaging device 5 in a direction perpendicular to the optical axis of the imaging optical system 1. The driving mechanism 3 moves the solid-state imaging device 5 under the control of a position control section 4. The driving mechanism 3 and the position control section 4 function as a relative position change section which changes the relative position of the imaging optical system 1 and the solid-state imaging device 5.

A system control section 11 which generally controls the whole electric control system of the digital camera controls a lens drive section 8 to move the focusing lens to the in-focus position, thereby adjusting the focal length or the zoom. Moreover, the system control section 11 controls the opening amount of the diaphragm 2 via a diaphragm drive section 9 to adjust the exposure amount.

Moreover, the system control section 11 drives the solid-state imaging device 5 via an imaging device drive section 10, to cause the object image captured through the imaging optical system 1 to be output as a captured image signal. A signal indicative instructions from the user is input to the system control section 11 via an operation section 14.

Moreover, the system control section 11 controls the position control section 4 to change the position of the solid-state imaging device 5.

Moreover, the system control section 11 controls a light emission section 12.

The electric control system of the digital camera further includes: an analog signal process section 6 which is connected to the output of the solid-state imaging device 5, and which performs an analog signal process such as a correlated double sampling process; and an A/D conversion circuit 7 which converts the captured image signal output from the analog signal process section 6, to a digital signal. These sections are controlled by the system control section 11.

The electric control system of the digital camera further includes: a main memory 16; a memory control section 15 which is connected to the main memory 16; a phase-difference pixel correction section 18 which performs an interpolation calculation on output signals of phase-difference pixels, the signals being contained in the captured image signal output from the A/D conversion circuit 7, by using output signals of pixels in the periphery of the phase-difference pixels, to correct the signals; a digital signal process section 17 which performs an interpolation calculation, a gamma correction calculation, an RGB/YC conversion process, and the like to produce captured image data with respect to the captured image data corrected by the phase-difference pixel correction section 18; a regular-imaging position determination section 19 which determines a relative position of the imaging optical system 1 and the solid-state imaging device 5 where the image quality of the captured image data is best; an external-memory control section 20 to which a detachable recording medium 21 is connected; and a display control section 22 to which a liquid crystal display section 23 mounted on the back surface of the camera or the like is connected.

The memory control section 15, the digital signal process section 17, the phase-difference pixel correction section 18, the regular-imaging position determination section 19, the external-memory control section 20, and the display control section 22 are connected to one another through a control bus 24 and a data bus 25, and controlled by instructions from the system control section 11.

Figure 2:
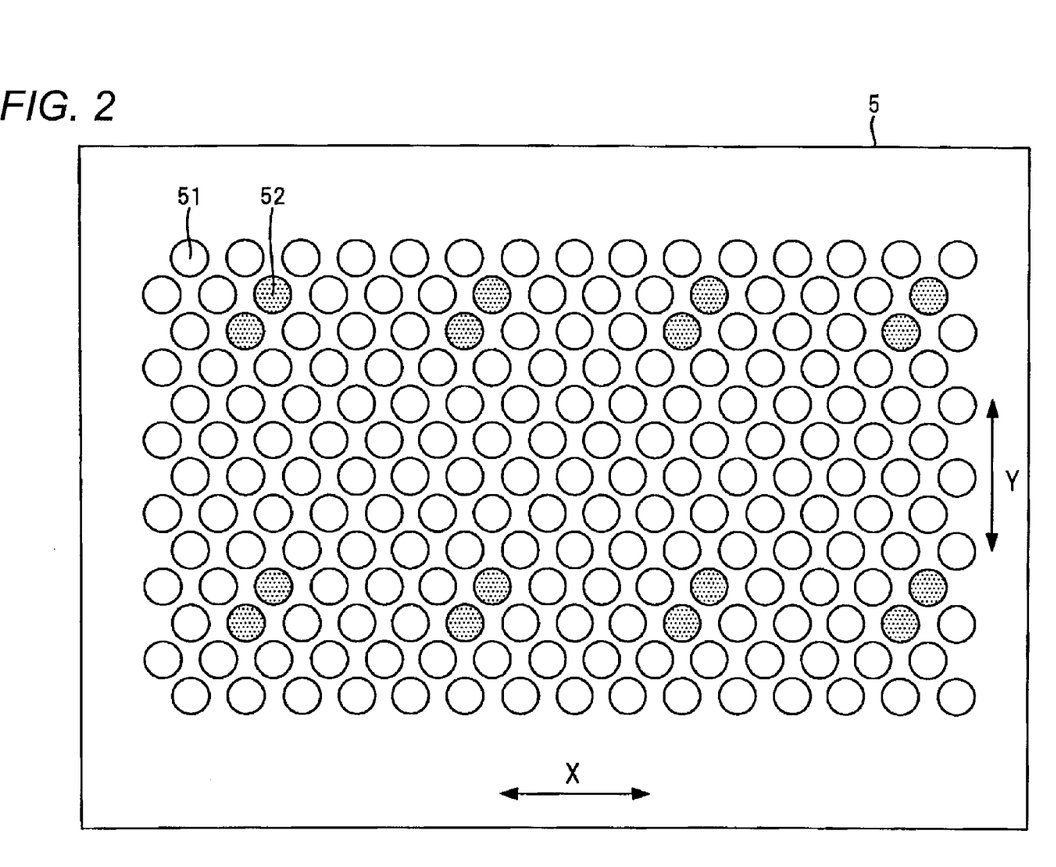
FIG. 2 is a plan diagram schematically showing the configuration of a solid-state imaging device in a digital camera shown in FIG. 1.

FIG. 2 is a plan diagram schematically showing the configuration of the solid-state imaging device in the digital camera shown in FIG. 1.

The solid-state imaging device 5 shown in FIG. 2 includes a large number of photoelectric converting elements (pixels) which are two-dimensionally arranged in a row direction X and a column direction Y perpendicular to the row direction.

The large number of pixels include at least one pair of two phase-difference pixels 52 which are adjacent to each other in an oblique direction. Among the large number of pixels, the pixels other than the pair are usual pixels 51.

In the example of FIG. 2, a plurality of pairs of phase-difference pixels 52 are placed at predetermined intervals in a region where the large number of pixels are placed.

Next, the operation in the case where the digital camera shown in FIG. 1 performs an imaging operation will be described.

When a shutter button included in the operation section 14 is half-depressed to give instructions for AE/AF, the system control section 11 performs an AE/AF control to adjust the position of the focusing lens, the aperture value of the diaphragm 2, and the like in the imaging optical system 1. The AF control means a process of controlling the focus area of the imaging optical system 1, based on output signals of the phase-difference pixels 52 in the captured image signal output from the solid-state imaging device 5.

Next, the system control section 11 controls the position control section 4 to move the solid-state imaging device 5 to a predetermined position, so that the relative position of the solid-state imaging device 5 and the imaging optical system 1 is set as a first relative position. In this state, then, the drive section 10 is controlled to cause the solid-state imaging device 5 to perform first provisional imaging. The captured image signal which is output from the solid-state imaging device 5 as a result of the first provisional imaging (hereinafter, such a signal is referred to as the first provisional captured image signal) is temporarily stored in the main memory 16.

Figure 3:
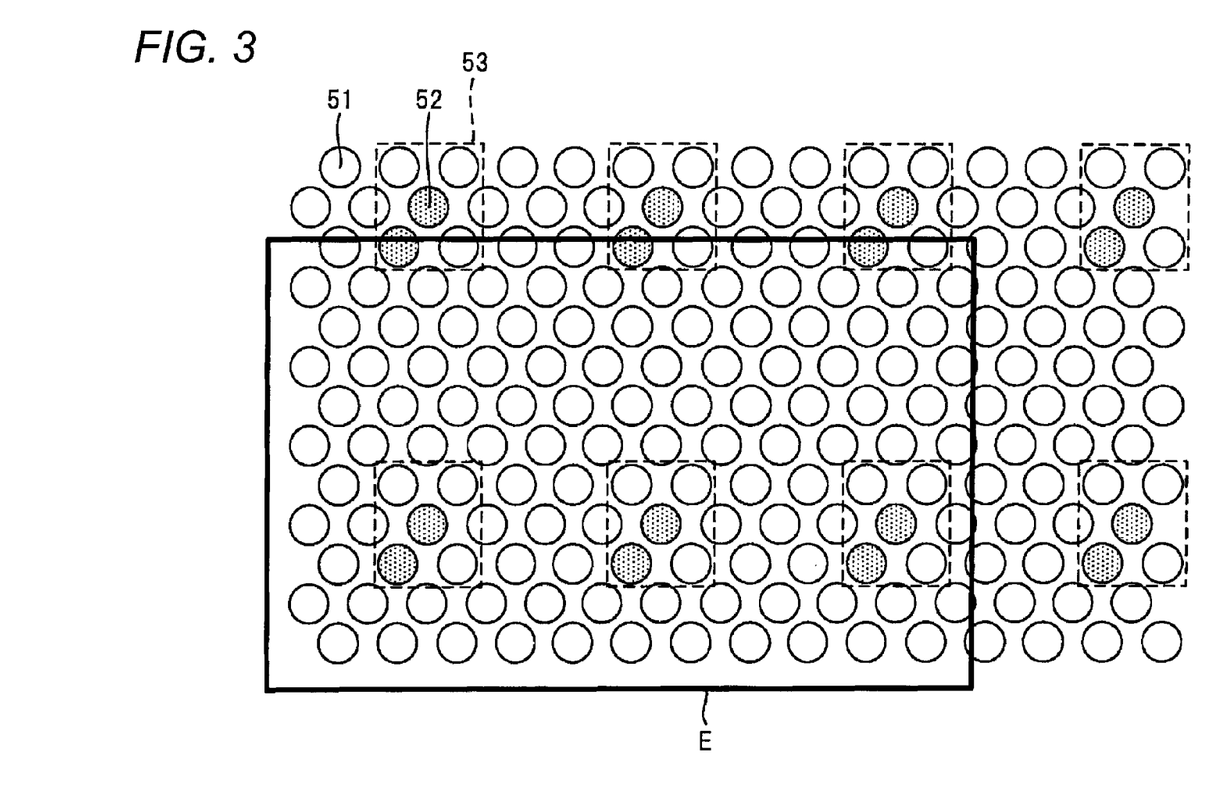
FIG. 3 is a view showing an object which is imaged onto a solid-state imaging device 5 when first provisional imaging is performed by the solid-state imaging device 5.

FIG. 3 is a view showing an object which is imaged onto the solid-state imaging device 5 when the first provisional imaging is performed by the solid-state imaging device 5. In the example of FIG. 3, during the first provisional imaging, an edge E included in the object overlaps with a part of the phase-difference pixels 52.

Next, the system control section 11 controls the position control section 4 to change the position of the solid-state imaging device 5, thereby setting the relative position of the imaging optical system 1 and the solid-state imaging device 5 to a second relative position. In this state, then, the drive section 10 is controlled to cause the solid-state imaging device 5 to perform second provisional imaging. The captured image signal which is output from the solid-state imaging device 5 as a result of the second provisional imaging (hereinafter, such a signal is referred to as the second provisional captured image signal) is temporarily stored in the main memory 16.

Figure 4:
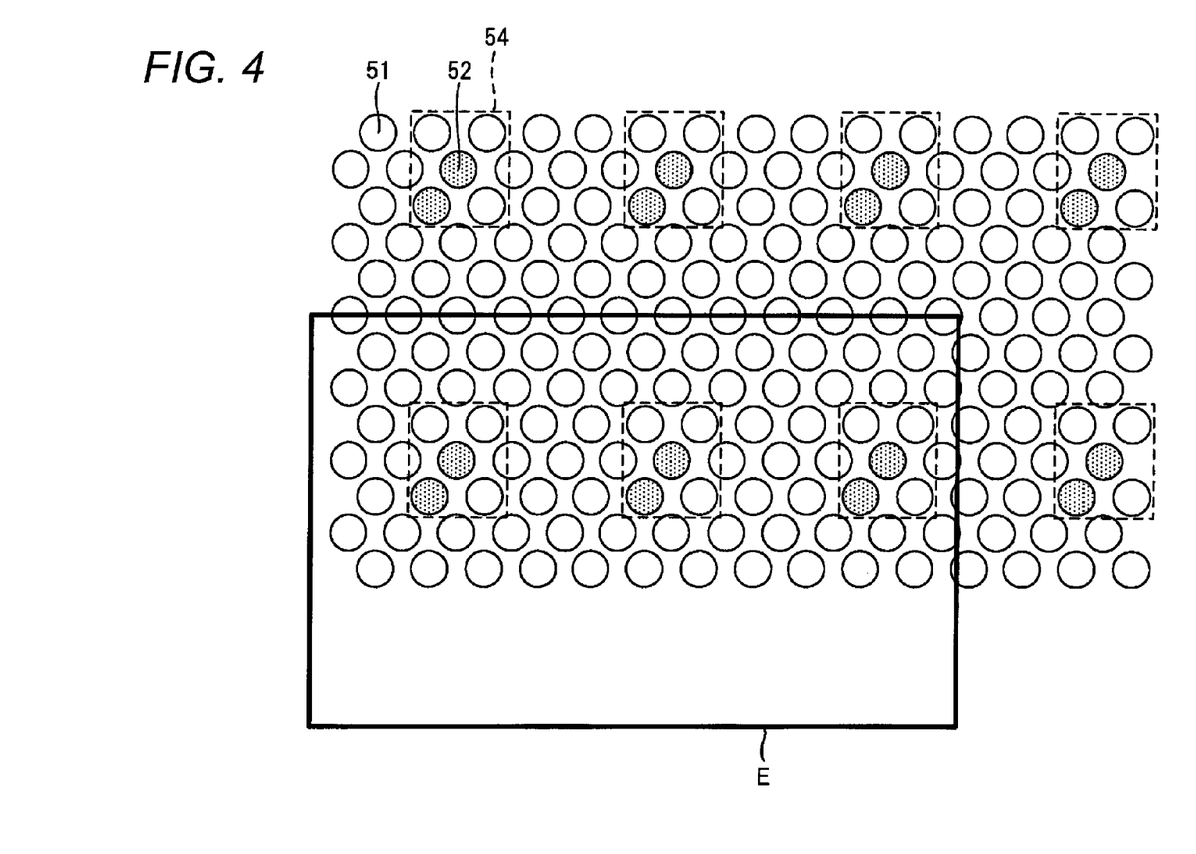
FIG. 4 is a view showing the object which is imaged onto the solid-state imaging device 5 when second provisional imaging is performed by the solid-state imaging device 5.

FIG. 4 is a view showing the object which is imaged onto the solid-state imaging device 5 when the second provisional imaging is performed by the solid-state imaging device 5. In the example of FIG. 4, as a result of the movement of the solid-state imaging device 5 in the column direction Y, during the second provisional imaging, the edge E included in the object does not overlap with any of the phase-difference pixels 52.

When the second provisional imaging is ended, the regular-imaging position determination section 19 starts a regular-imaging position determining process.

The regular-imaging position determination section 19 first extracts, from the first provisional captured image signal, output signals of pixels existing in a plurality of first areas which are preset in a region where a plurality of pixels of the solid-state imaging device 5 are placed, and, for each of the first areas, calculates the standard deviation of output signals of the pixels in the first area.

The first areas are set correspondingly to the pairs of the phase-difference pixels 52 included in the solid-state imaging device 5, and set so as to include one pair of phase-difference pixels 52 and pixels 51 in the periphery of the pair.

As shown in FIG. 3, for example, first areas 53 each including a pair of phase-difference pixels 52 and three pixels 51 in the periphery thereof are set in the number (in the example of FIG. 3, eight) equal to the total number of the pairs of phase-difference pixels 52 in the solid-state imaging device 5.

In the case where a plurality of first areas are set as shown in FIG. 3, the regular-imaging position determination section 19 extracts output signals of all of the pixels existing in the eight first areas 53, from the first provisional captured image signal, and, for each of the eight first areas 53, calculates the standard deviation (hereinafter, referred to as the standard deviation A) of output signals of the five pixels existing in the first area 53. As a result, eight standard deviations A corresponding to the eight first areas 53 are calculated.

Next, the regular-imaging position determination section 19 extracts, from the second provisional captured image signal, output signals of pixels existing in a plurality of second areas which are preset in a region where a plurality of pixels of the solid-state imaging device 5 are placed, and, for each of the second areas, calculates the standard deviation of output signals of pixels in the second area.

Each of the respective second areas is set correspondingly to each of the first areas. The second area corresponding to one of the first areas is an area which contains the pair of the phase-difference pixels 52 included in the first area, and which has the same size (including the same number of pixels) as that of the first area.

In the solid-state imaging device 5, for example, the second areas 54 are set in the exactly same manner as the first areas 53 as shown in FIG. 4.

In the case where a plurality of second areas are set as shown in FIG. 4, the regular-imaging position determination section 19 extracts output signals of all of the pixels existing in the eight second areas 54, from the second provisional captured image signal, and, for each of the eight second areas 54, calculates the standard deviation (hereinafter, referred to as the standard deviation B) of the output signals of the five pixels existing in the second area 54. As a result, eight standard deviations B corresponding to the eight second areas 54 are calculated.

The first area 53 and the second area 54 corresponding thereto include the pair of the same phase-difference pixels 52. Therefore, the above-described standard deviations A and standard deviations B are calculated correspondingly to the respective all pairs of the phase-difference pixels 52 included in the solid-state imaging device 5.

Next, the regular-imaging position determination section 19 compares the standard deviation A obtained with respect to the first area with the standard deviation B obtained with respect to the second area corresponding to the first area. It is assumed that, as a result of the comparison, the absolute value of the difference between the standard deviation A and the standard deviation B is smaller than a threshold. This case means that, as a result of the imaging after moving the solid-state imaging device 5, the dispersion of the pixel outputs of the first area, and that of the pixel outputs of the second area are substantially unchanged. Namely, it is possible to determine that, in both of the first relative position and the second relative position, the object other than the edge E overlaps with the paired phase-difference pixels 52 which are included commonly in the first area and the second area. In the case where the absolute value of the difference between the standard deviation A and the standard deviation B is smaller than the threshold, therefore, the regular-imaging position determination section 19 determines that, in both of the first relative position and the second relative position, the edge E does not overlap with the paired phase-difference pixels 52 which are included commonly in the first area and the second area corresponding thereto.

By contrast, in the case where, as a result of the comparison, the absolute value of the difference between the standard deviation A and the standard deviation B is equal to or larger than the threshold, this case means that, as a result of the imaging after moving the solid-state imaging device 5, the dispersion of the pixel outputs of the first area, and that of the pixel outputs of the second area corresponding to the first area are largely changed. Namely, it is possible to determine that, in one of the first relative position and the second relative position, the edge E overlaps with one or both of the paired phase-difference pixels 52 which are included commonly in the first area and the second area corresponding thereto.

In the case where, in the first relative position, the edge E overlaps with one or both of the paired phase-difference pixels 52 in a certain area, the relationship between the standard deviation A and the standard deviation B corresponding to the pair is the standard deviation A>the standard deviation B. Conversely, in the case where, in the second relative position, the edge E overlaps, the standard deviation A<the standard deviation B. In the case where the absolute value of the difference between the standard deviation A and the standard deviation B is equal to or larger than the threshold, therefore, the regular-imaging position determination section 19 determines that, in the relative position where the provisional captured image signal from which the larger one of the standard deviation A and the standard deviation B is calculated is obtained, the edge E overlaps with at least one of the paired phase-difference pixels 52, and that, in the relative position where the provisional captured image signal from which the smaller one of the standard deviation A and the standard deviation B is calculated is obtained, the edge E does not overlap with at least one of the paired phase-difference pixels 52.

As described above, on each of the pairs of the phase-difference pixels 52, the regular-imaging position determination section 19 performs a determining process of determining whether the edge E overlaps with at least one of the paired phase-difference pixels 52 in each of the first relative position and the second relative position, by the comparison of the standard deviation A obtained with respect to the first area with the standard deviation B obtained with respect to the second area corresponding to the first area (in other words, the comparison of the standard deviations A and standard deviations B which are obtained correspondingly to all the pairs of the phase-difference pixels 52 included in the solid-state imaging device 5).

According to the determining process, for each of the pairs of the phase-difference pixels 52 included the solid-state imaging device 5, one of the following determination results is obtained: the edge E does not overlap with the pair of the phase-difference pixels 52 in any of the first relative position and the second relative position; the edge E overlaps with at least one of the paired phase-difference pixels 52 in the first relative position; and the edge E overlaps with at least one of the paired phase-difference pixels 52 in the second relative position.

Based on the determination result, the regular-imaging position determination section 19 determines a relative position which is one of the first relative position and the second relative position, and in which the number of pairs of the phase-difference pixels 52 with which the edge E overlaps is minimum, as the relative position in regular imaging.

In the example of FIGS. 3 and 4, with respect to the three pairs of phase-difference pixels 52 on the left side in the four pairs on the upper side, it is determined that, in the first relative position, the edge E overlaps with at least one of the paired phase-difference pixels 52. With respect to the other five pairs of the phase-difference pixels 52, it is determined that, in both the first relative position and the second relative position, the edge E does not overlap with the pair of the phase-difference pixels 52. Namely, it is possible to determine that, in the first relative position, there are three pairs of the phase-difference pixels 52 with which the edge overlaps, and, in the second relative position, there is no pair of the phase-difference pixels 52 with which the edge overlaps. Therefore, the relative position in which the number of pairs of the phase-difference pixels 52 with which the edge E overlaps is minimum is the second relative position, and the second relative position is determined as the relative position in the regular imaging.

When the regular-imaging position determination section 19 determines the relative position in the regular imaging, the system control section 11 causes the solid-state imaging device 5 to be moved so as to attain the determined relative position, and sets an imaging waiting state. When the shutter button included in the operation section 14 is fully depressed to give instructions for imaging, the system control section 11 causes the solid-state imaging device 5 to perform the regular imaging.

The captured image signal which is output from the solid-state imaging device 5 as a result of the regular imaging is stored in the main memory 16. Then, the phase-difference pixel correction section 18 corrects the output signals of the phase-difference pixels 52 contained in the captured image signal, by interpolation using the output signals of the pixels 51 in the periphery of the phase-difference pixels 52.

After the correction by the phase-difference pixel correction section 18 is ended, the digital signal process section 17 performs a digital signal process on the corrected captured image signal to produce captured image data. The captured image data are recorded in the recording medium 21.

As described above, the digital camera shown in FIG. 1 performs, before the regular imaging, two times provisional imaging, and calculates the two standard deviations A, B corresponding to the pairs of the phase-difference pixels 52, from the captured image signals obtained in the provisional imagings. By the comparison of the standard deviations A, B, the determining process of determining the number of pairs of the phase-difference pixels 52 with which the edge overlaps in the first relative position, and that of pairs of the phase-difference pixels 52 with which the edge overlaps in the second relative position is performed. In accordance with the result of the determining process, then, a relative position of the imaging optical system 1 and the solid-state imaging device 5 where the number of pairs of the phase-difference pixels 52 with which the edge overlaps is minimum is determined, and the regular imaging is performed based on the determined relative position. According to the configuration, the regular imaging can be performed in the state where the number of pairs of the phase-difference pixels 52 with which the edge overlaps is made minimum. Even when correction is performed by the phase-difference pixel correction section 18, a trace of the correction can be made inconspicuous.

In the case where, in the first relative position and the second relative position, the numbers of pairs of the phase-difference pixels 52 with which the edge E overlaps are equal to each other, it is preferable that the second relative position which is the relative position when the last provisional imaging is performed is determined as the relative position in the regular imaging. In this configuration, the regular imaging can be performed without moving the solid-state imaging device 5, and therefore reduction of the power consumption, and high-speed processing are enabled.

In the above description, the provisional imaging is performed only two times. Alternatively, the provisional imaging may be performed three or more times. In the case where the provisional imaging is performed three times, for example, the standard deviation A, the standard deviation B, and a further standard deviation (indicated by C) are calculated correspondingly to the pair of the phase-difference pixels 52.

In this case, by the comparison of the standard deviation A and the standard deviation B, the number of pairs of the phase-difference pixels 52 with which the edge overlaps in the first relative position, and that of pairs of the phase-difference pixels 52 with which the edge overlaps in the second relative position are determined. Moreover, by the comparison of the standard deviation A and the standard deviation C, the number of pairs of the phase-difference pixels 52 with which the edge overlaps in the first relative position, and that of pairs of the phase-difference pixels 52 with which the edge overlaps in a third relative position (the relative position in the third provisional imaging) are determined. As a result of the determinations, the relative position where the number of pairs of the phase-difference pixels 52 with which the edge overlaps is minimum is selected from the first relative position, the second relative position, and the third relative position, and the selected position may be determined as the relative position in the regular imaging. Also in this case, in the case where, in the first relative position, the second relative position, and the third relative position, the numbers of pairs of the phase-difference pixels 52 with which the edge E overlaps are equal to each other, it is preferable that the third relative position which is the relative position when the last provisional imaging is performed is determined as the relative position in the regular imaging.

The number of the provisional imaging processes may be previously determined. Alternatively, when the relative position in the regular imaging cannot be determined as a result of two provisional imagings, provisional imaging may be further performed.

In the case where the number of pairs of the phase-difference pixels 52 with which the edge overlaps in the first relative position, and that of pairs of the phase-difference pixels 52 with which the edge overlaps in the second relative position are equal to each other or different from each other by a small difference (a difference smaller than a threshold), for example, it is difficult to determine that, in which of the relative positions, the number of pairs of the phase-difference pixels 52 with which the edge overlaps is smaller. In this case, therefore, third provisional imaging may be performed, and the numbers of pairs of the phase-difference pixels 52 with which the edge overlaps in the three relative positions may be compared to one another, thereby determining the relative position in the regular imaging. Namely, provisional imaging may be repeatedly performed until the numbers of pairs of the phase-difference pixels 52 with which the edge overlaps are different from each other by a certain degree (a difference which is equal to or larger than the threshold).

For example, the above-described second relative position may be set to: a position where the solid-state imaging device 5 is horizontally shifted from the first relative position by about ½ of the horizontal arrangement pitch of the phase-difference pixels 52; that where the solid-state imaging device 5 is vertically shifted from the first relative position by about ½ of the vertical arrangement pitch of the phase-difference pixels 52; or that where the solid-state imaging device 5 is shifted horizontally and vertically from the first relative position by about ½ of the horizontal arrangement pitch and about ½ of the vertical arrangement pitch of the phase-difference pixels 52. The edge E often extends in a horizontal direction. Therefore, the direction of the movement of the solid-state imaging device 5 is preferably set by giving priority to the vertical direction.

In the case where the provisional imaging is performed three or more times, in the third and following provisional imagings, it is preferable that the moving distance of the solid-state imaging device 5 is gradually shortened. In the second provisional imaging, for example, the solid-state imaging device 5 may be shifted in one of the horizontal and vertical directions from the first relative position by ½ of the arrangement pitch of the phase-difference pixels 52, and, in the third provisional imaging process, the solid-state imaging device 5 may be shifted in one of the horizontal and vertical directions from the second relative position by ⅓ of the arrangement pitch of the phase-difference pixels 52.

Next, modifications of the digital camera shown in FIG. 1 will be described.

(First Modification)

Figure 5:
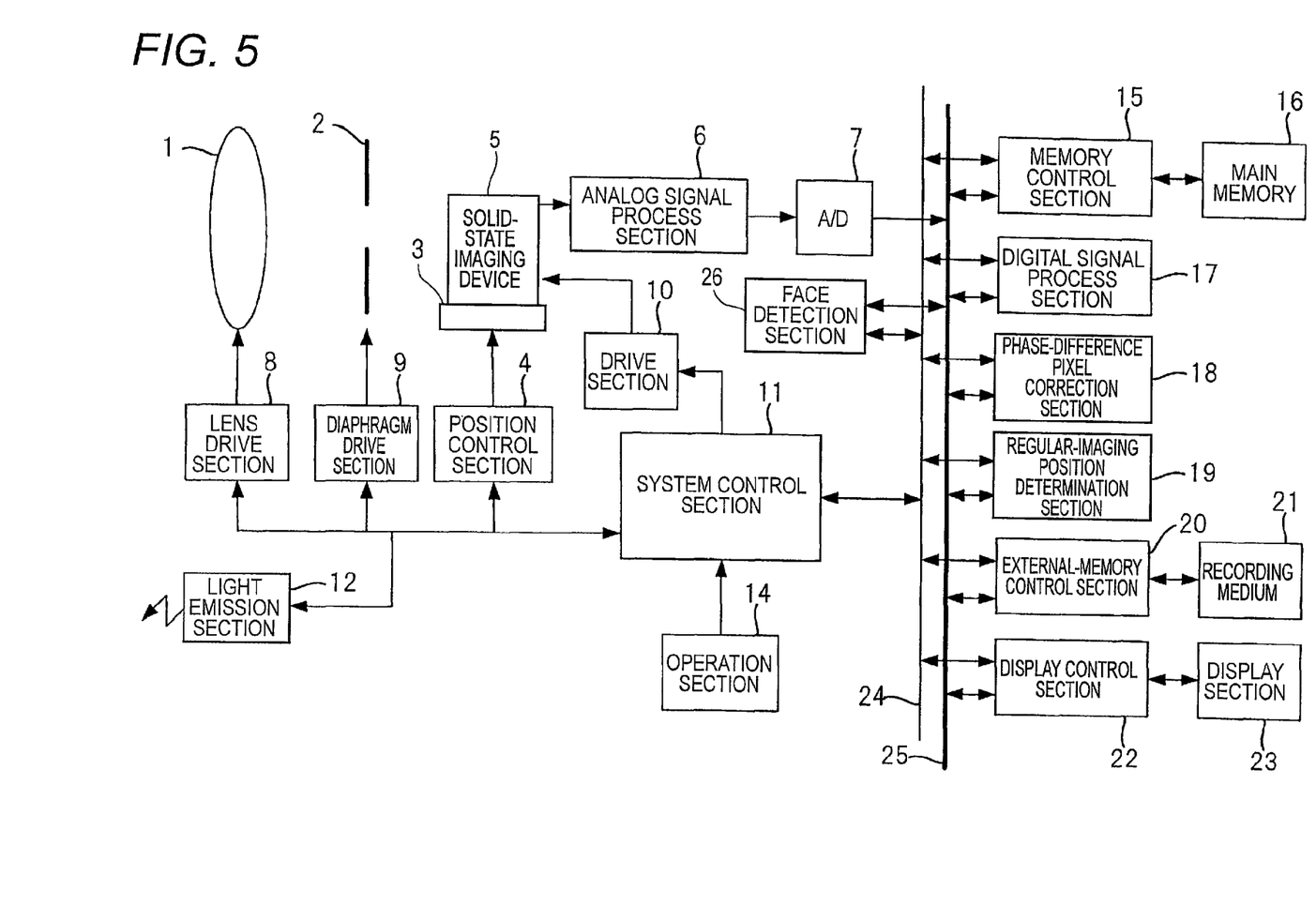
FIG. 5 is a view schematically showing the configuration of a digital camera which is a first modification of the digital camera shown in FIG. 1.

FIG. 5 is a view schematically showing the configuration of a digital camera which is a first modification of the digital camera shown in FIG. 1. The digital camera shown in FIG. 5 is identical with the configuration shown in FIG. 1 except that a face detection section 26 is added.

The face detection section 26 applies a face detecting process on the captured image signal output from the solid-state imaging device 5.

In the case where, immediately before the first provisional imaging is performed, a face area is detected by the face detection section 26 from the captured image signal output from the solid-state imaging device 5, the regular-imaging position determination section 19 of the digital camera shown in FIG. 5 excludes a pair(s) of the phase-difference pixels 52 which is outside a range in the solid-state imaging device 5 corresponding to the face area (the range onto which the face area is imaged), from the target of the determining process. Then, the determining process is performed only on the pairs of the phase-difference pixels 52 which are within the range, to determine the relative position in the regular imaging. By contrast, in the case where, immediately before the first provisional imaging is performed, a face area is not detected by the face detection section 26 from the captured image signal output from the solid-state imaging device 5, the regular-imaging position determination section 19 performs the determining process on all the pairs of the phase-difference pixels 52, and determines the relative position in the regular imaging based on the result of the determining process.

Figure 6:
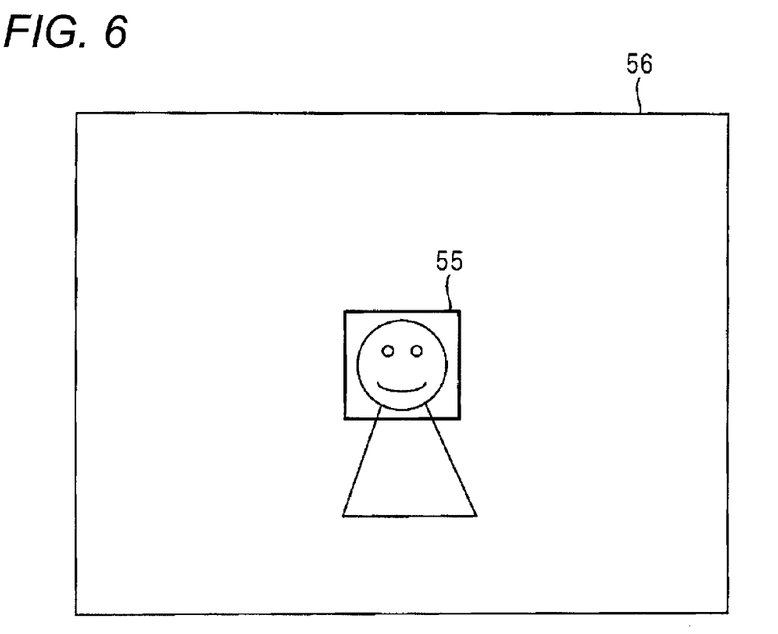
FIG. 6 is a view illustrating the operation of the digital camera shown in FIG. 5.

For example, the case will be considered where, immediately before the first provisional imaging is performed, a face area 55 is detected by the face detection section 26 from a captured image signal 56 output from the solid-state imaging device 5 as shown in FIG. 6. Output signals constituting the captured image signal 56 correspond to the plurality of pixels of the solid-state imaging device 5. Therefore, the range in the solid-state imaging device 5 corresponding to the face area 55 is determined. The regular-imaging position determination section 19 performs the determining process on only pairs of the phase-difference pixels 52 which are within the range in the solid-state imaging device 5 corresponding to the face area 55. Then, the regular-imaging position determination section 19 determines the relative position in the regular imaging based on the result of the determining process.

An edge is often contained in the face, and the face is often set as a main object. Therefore, image quality deterioration due to a trace of correction tends to be conspicuous. When the object contains the face, therefore, the regular-imaging position determination section 19 performs, while limiting to pairs of the phase-difference pixels 52 which are in the periphery of the face, the determining process on each of the pairs, and determines the relative position in the regular imaging. According to the configuration, image quality deterioration due to a trace of correction can be effectively prevented from occurring, while largely reducing the amount of calculation.

In the case where, immediately before the first provisional imaging is performed, a face area is not detected by the face detection section 26 from the captured image signal output from the solid-state imaging device 5, the system control section 11 may perform a control so as not to conduct the provisional imaging, the determining process, and the process of determining the relative position in the regular imaging based on the result of the determining process, and the regular-imaging position determination section 19 may determine a predetermined relative position (for example, the relative position which is set in the previous regular imaging, or a relative position which is randomly set), as the relative position in the regular imaging. As described above, when the object contains the face, a trace of correction is particularly conspicuous. In the case of an object which does not contain the face, therefore, a predetermined relative position may be determined as the relative position in the regular imaging, whereby the time period which elapses before the regular imaging is enabled can be shortened.

(Second Modification)

The configuration of a digital camera of a second modification is identical with that shown in FIG. 1. In the digital camera, the regular-imaging position determination section 19 limits pairs of the phase-difference pixels 52 which are used as targets of the determining process, to those which are within the range where the object in the focus area of the imaging optical system 1 is imaged in the first provisional imaging.

Based on information of the focus area of the imaging optical system 1 in the first provisional imaging, the regular-imaging position determination section 19 of the digital camera of the second modification excludes pairs of the phase-difference pixels 52 which are outside the range in the solid-state imaging device 5 where the object in the focus area is imaged, from targets of the determining process. Then, the regular-imaging position determination section 19 performs the determining process on only pairs of the phase-difference pixels 52 which are within the area, and determines the relative position in the regular imaging based on the result of the determining process.

With respect to the object in the focus area, image quality deterioration due to a trace of correction is conspicuous. According to the configuration, therefore, the amount of calculation required for determination of the relative position in the regular imaging can be reduced while sufficiently preventing image quality deterioration from occurring.

(Third Modification)

The configuration of a digital camera of a third modification is identical with that shown in FIG. 1. In the digital camera, the regular-imaging position determination section 19 limits pairs of the phase-difference pixels 52 which are used as targets of the determining process, to those which are within a range in the solid-state imaging device 5 that is designated by the user.

Based on information of the range which is designated via the operation section 14 before the first provisional imaging, the regular-imaging position determination section 19 of the digital camera of the third modification excludes pairs of the phase-difference pixels 52 which are outside the range in the solid-state imaging device 5 where the object in the range is imaged, from targets of the determining process. Then, the regular-imaging position determination section 19 performs the determining process on only pairs of the phase-difference pixels 52 which are within the range, and determines the relative position in the regular imaging based on the result of the determining process.

According to the configuration, image quality deterioration in a range in which the user is interested can be prevented from occurring. Moreover, such an effect can be attained while reducing the amount of calculation required for determination of the relative position in the regular imaging.

(Fourth Modification)

The configuration of a digital camera of a fourth modification is identical with that shown in FIG. 1. In the digital camera, the regular-imaging position determination section 19 limits pairs of the phase-difference pixels 52 which are used as targets of the determining process, to a part of the pairs existing in the middle of the solid-state imaging device 5.

When a trace of correction is in the middle of the captured image data, the trace is conspicuous. Therefore, only a part of the phase-difference pixels 52 in the middle of the solid-state imaging device 5 are used as targets of the determining process. According to the configuration, the image quality can be effectively improved while reducing the amount of calculation required for determination of the relative position in the regular imaging.

In the above description, it has been assumed that the relative position of the imaging optical system 1 and the solid-state imaging device 5 is changed by changing the position of the solid-state imaging device 5. Alternatively, the relative position may be changed by changing the position of the imaging optical system 1, or the relative position may be changed by changing both the positions of the imaging optical system 1 and the solid-state imaging device 5.

In the above description, furthermore, it has been assumed that a plurality of pairs of the phase-difference pixels 52 exist. Even in a configuration where only one pair of the phase-difference pixels 52 exists, however, it is possible to make a trace of correction inconspicuous. In this case, the standard deviations A, B are calculated with respect to the one pair of the phase-difference pixels 52, and the determining process is performed based on the comparison of them. In accordance with the result of the determining process, then, a relative position of the imaging optical system 1 and the solid-state imaging device 5 where the number of pairs of the phase-difference pixels 52 with which the edge overlaps is minimum is determined, and the regular imaging is performed based on the determined relative position. Also in this case, in the case where, in the first relative position and the second relative position, the numbers of pairs of the phase-difference pixels 52 with which the edge E overlaps are equal to each other (zero or one), it is preferable that the third relative position which is the relative position when the last provisional imaging is performed is determined as the relative position in the regular imaging.

As described above, the following matters are disclosed in the specification.

The disclosed imaging apparatus comprises a solid-state imaging device having pixels which include at least one pair of phase-difference pixels, and which are two-dimensionally arranged, in which the apparatus further comprises: an imaging optical system; a position change section which changes a relative position of the imaging optical system and the solid-state imaging device in a direction perpendicular to an optical axis of the imaging optical system; a provisional-imaging control section which causes the solid-state imaging device to perform provisional imaging a plurality of times while changing the relative position; a relative position determination section which determines one of the relative positions that are obtained when the plurality of provisional imagings are performed, as a relative position in regular imaging, on the basis of, among a plurality of captured image signals which are output from the solid-state imaging device in the plurality of provisional imagings, output signals which correspond to a part or all of the pairs included in the solid-state imaging device, and which are obtained from pixels in areas including the pairs; and a regular-imaging control section which causes the solid-state imaging device to perform regular imaging in the relative position that is determined by the relative position determination.

In the disclosed imaging apparatus, the relative position determination section calculates a standard deviation of the output signals which are obtained from the pixels in the areas, for each of the plurality of captured image signals, performs a determining process of, on the basis of a comparison of the standard deviations, determining, for each of the relative positions when the plurality of provisional imagings are performed, whether an edge overlaps with at least one phase-difference pixel of the pairs in the areas or not, and determines the relative position in the regular imaging on the basis of a result of the determining process.

In the disclosed imaging apparatus, on the basis of the result of the determining process which is performed for each of the pairs, from the relative positions when the plurality of provisional imagings are performed, the relative position determination section determines the relative position in which the number of pairs of the phase-difference pixels with which the edge overlaps is minimum, as the relative position in the regular imaging.

In the disclosed imaging apparatus, the relative position determination section sets ones of all the pairs as targets of the determining process, the ones being within a range corresponding to an object.

In the disclosed imaging apparatus, the apparatus further includes a face detection section which detects a face area from the captured image signal output from the solid-state imaging device, and, in a case where the face area is detected, the relative position determination section sets ones of all the pairs as the target of the determining process, the ones being within a range in the solid-state imaging device onto which the face area detected by the face detection section is imaged, and, in a case where the face area is not detected, sets all the pairs as the target of the determining process.

In the disclosed imaging apparatus, the apparatus further includes a face detection section which detects a face area from the captured image signal output from the solid-state imaging device, in a case where the face area is detected, the provisional-imaging control section performs the provisional imaging, and, in a case where the face area is not detected, aborts the provisional imaging, and, in the case where the face area is detected, the relative position determination section sets ones of all the pairs as the target of the determining process, the ones being within a range in the solid-state imaging device onto which the face area detected by the face detection section is imaged, and, in the case where the face area is not detected, omits the determining process, and determines the predetermined relative position as the relative position in the regular imaging.

In the disclosed imaging apparatus, the apparatus further includes a focus area control section which controls a focus area of the imaging optical system, on the basis of signals obtained from the phase-difference pixels, and the relative position determination section sets ones of all the pairs as the target of the determining process, the ones being within a range in the solid-state imaging device onto which the object in the focus area is imaged.

In the disclosed imaging apparatus, the relative position determination section sets ones of all the pairs as targets of the determining process, the ones being within a range which is designated by an external operation, and which is in the solid-state imaging device.

In the disclosed imaging apparatus, the relative position determination section sets a part of the pairs as targets of the determining process, the part existing in a middle of the solid-state imaging device.

In the disclosed imaging apparatus, in a case where the provisional imaging is performed three or more times, the provisional-imaging control section gradually reduces a change amount of the relative position.

In the disclosed imaging apparatus, the provisional-imaging control section shifts a position of the solid-state imaging device with respect to the imaging optical system in at least one of the vertical direction and a horizontal direction perpendicular to the direction, thereby changing the relative position.

In the disclosed imaging apparatus, the provisional-imaging control section shifts the position of the solid-state imaging device with respect to the imaging optical system in the vertical direction, thereby changing the relative position.

The disclosed imaging method uses a solid-state imaging device having pixels which include at least one pair of phase-difference pixels, and which are two-dimensionally arranged, in which the method comprises: a position changing step of changing a relative position of the imaging optical system and the solid-state imaging device in a direction perpendicular to an optical axis of the imaging optical system; a provisional-imaging controlling step of causing the solid-state imaging device to perform provisional imaging a plurality of times while changing the relative position; a relative position determining step of determining one of the relative positions that are obtained when the plurality of provisional imagings are performed, as a relative position in regular imaging, on the basis of, among a plurality of captured image signals which are output from the solid-state imaging device in the plurality of provisional imagings, output signals which correspond to a part or all of the pairs included in the solid-state imaging device, and which are obtained from pixels in areas including the pairs; and a regular-imaging controlling step of causing the solid-state imaging device to perform regular imaging in the relative position that is determined in the relative position determining.

In the disclosed imaging method, in the relative position determining step, a standard deviation of the output signals which are obtained from the pixels in the areas is calculated for each of the plurality of captured image signals, a determining process of, on the basis of a comparison of the standard deviations, for each of the relative positions when the plurality of provisional imagings are performed, determining whether an edge overlaps with at least one phase-difference pixel of the pairs in the areas or not is performed, and the relative position in the regular imaging is determined on the basis of a result of the determining process.

In the disclosed imaging method, in the relative position determining step, on the basis of the result of the determining process which is performed for each of the pairs, from the relative positions when the plurality of provisional imagings are performed, the relative position in which the number of pairs of the phase-difference pixels with which the edge overlaps is minimum is determined as the relative position in the regular imaging.

In the disclosed imaging method, in the relative position determining step, ones of all the pairs are set as targets of the determining process, the ones being within a range corresponding to an object.

In the disclosed imaging method, the method further includes a face detecting step of detecting a face area from the captured image signal output from the solid-state imaging device, and, in the relative position determining step, in a case where the face area is detected, ones of all the pairs are set as the target of the determining process, the ones being within a range in the solid-state imaging device onto which the face area detected by the face detection section is imaged, and, in a case where the face area is not detected, all the pairs are set as the target of the determining process.

In the disclosed imaging method, the method further includes a face detecting step of detecting a face area from the captured image signal output from the solid-state imaging device, in the relative position determining step, in a case where the face area is detected, the provisional imaging is performed, and, in a case where the face area is not detected, the provisional imaging is aborted, and, in the relative position determining step, in the case where the face area is detected, ones of all the pairs are set as the target of the determining process, the ones being within a range in the solid-state imaging device onto which the face area detected by the face detection section is imaged, and, in the case where the face area is not detected, the determining process is omitted, and the predetermined relative position is determined as the relative position in the regular imaging.

In the disclosed imaging method, the method further includes a focus area controlling step of controlling a focus area of the imaging optical system, on the basis of signals obtained from the phase-difference pixels, and, in the relative position determining step, ones of all the pairs are set as the target of the determining process, the ones being within a range in the solid-state imaging device onto which the object in the focus area is imaged.

In the disclosed imaging method, in the relative position determining step, ones of all the pairs are set as targets of the determining process, the ones being within a range which is designated by an external operation, and which is in the solid-state imaging device.

In the disclosed imaging method, in the relative position determining step, a part of the pairs is set as targets of the determining process, the part existing in a middle of the solid-state imaging device.

In the disclosed imaging method, in the provisional-imaging controlling step, in a case where the provisional imaging is performed three or more times, a change amount of the relative position is gradually reduced.

In the disclosed imaging method, in the provisional-imaging controlling step, a position of the solid-state imaging device with respect to the imaging optical system is shifted in at least one of the vertical direction and a horizontal direction perpendicular to the direction, thereby changing the relative position.

In the disclosed imaging method, in the provisional-imaging controlling step, the position of the solid-state imaging device with respect to the imaging optical system is shifted in the vertical direction, thereby changing the relative position.

INDUSTRIAL APPLICABILITY

According to the invention, it is possible to provide an imaging apparatus and imaging method which, even when an edge overlaps with phase-difference pixels, can make inconspicuous a trace of correction that is formed as a result of correction of output signals of the phase-difference pixels.

Although the invention has been described in detail and with reference to the specific embodiment, it is obvious to those skilled in the art that various changes and modifications can be made without departing from the spirit and scope of the invention.

The application is based on Japanese Patent Application (No. 2010-105917) filed Apr. 30, 2010, and its disclosure is incorporated herein by reference.

REFERENCE SIGNS LIST 1 imaging optical system
5 solid-state imaging device
4 position control section
11 system control section
19 regular-imaging position determination section
51 pixel
52 phase-difference pixel
53, 54 area

The invention claimed is:

1. An imaging method using a solid-state imaging device having pixels which include at least one pair of phase-difference pixels, and which are two-dimensionally arranged, wherein the method comprises:
    a position changing step of changing a relative position of the imaging optical system and the solid-state imaging device in a direction perpendicular to an optical axis of the imaging optical system;
    a provisional-imaging controlling step of causing the solid-state imaging device to perform provisional imaging a plurality of times while changing the relative position;
    a relative position determining step of determining one of the relative positions that are obtained when the plurality of provisional imagings are performed, as a relative position in regular imaging, on the basis of, among a plurality of captured image signals which are output from the solid-state imaging device in the plurality of provisional imagings, output signals which correspond to a part or all of the pairs included in the solid-state imaging device, and which are obtained from pixels in areas including the pairs; and
    a regular-imaging controlling step of causing the solid-state imaging device to perform regular imaging in the relative position that is determined in the relative position determining.

2. The imaging method according to claim 1, wherein
    in the relative position determining step, a standard deviation of the output signals which are obtained from the pixels in the areas is calculated for each of the plurality of captured image signals, a determining process of, on the basis of a comparison of the standard deviations, for each of the relative positions when the plurality of provisional imagings are performed, determining whether an edge overlaps with at least one phase-difference pixel of the pairs in the areas or not is performed, and the relative position in the regular imaging is determined on the basis of a result of the determining process.

3. The imaging method according to claim 2, wherein
    in the relative position determining step, on the basis of the result of the determining process which is performed for each of the pairs, from the relative positions when the plurality of provisional imagings are performed, the relative position in which the number of pairs of the phase-difference pixels with which the edge overlaps is minimum is determined as the relative position in the regular imaging.

4. The imaging method according to claim 2, wherein
    in the relative position determining step, ones of all the pairs are set as targets of the determining process, the ones being within a range corresponding to an object.

5. The imaging method according to claim 4, wherein
the method further includes a face detecting step of detecting a face area from the captured image signal output from the solid-state imaging device, and,
in the relative position determining step, in a case where the face area is detected, ones of all the pairs are set as the target of the determining process, the ones being within a range in the solid-state imaging device onto which the face area detected by the face detection section is imaged, and, in a case where the face area is not detected, all the pairs are set as the target of the determining process.

6. The imaging method according to claim 4, wherein
the method further includes a face detecting step of detecting a face area from the captured image signal output from the solid-state imaging device,
in the relative position determining step, in a case where the face area is detected, the provisional imaging is performed, and, in a case where the face area is not detected, the provisional imaging is aborted, and,
in the relative position determining step, in the case where the face area is detected, ones of all the pairs are set as the target of the determining process, the ones being within a range in the solid-state imaging device onto which the face area detected by the face detection section is imaged, and, in the case where the face area is not detected, the determining process is omitted, and the predetermined relative position is determined as the relative position in the regular imaging.

7. The imaging method according to claim 4, wherein
the method further includes a focus area controlling step of controlling a focus area of the imaging optical system, on the basis of signals obtained from the phase-difference pixels, and,
in the relative position determining step, ones of all the pairs are set as the target of the determining process, the ones being within a range in the solid-state imaging device onto which the object in the focus area is imaged.

8. The imaging method according to claim 2, wherein
in the relative position determining step, ones of all the pairs are set as targets of the determining process, the ones being within a range which is designated by an external operation, and which is in the solid-state imaging device.

9. The imaging method according to claim 2, wherein
in the relative position determining step, a part of the pairs is set as targets of the determining process, the part existing in a middle of the solid-state imaging device.

10. The imaging method according to claim 1, wherein
in the provisional-imaging controlling step, in a case where the provisional imaging is performed three or more times, a change amount of the relative position is gradually reduced.

11. The imaging method according to claim 1, wherein
in the provisional-imaging controlling step, a position of the solid-state imaging device with respect to the imaging optical system is shifted in at least one of the vertical direction and a horizontal direction perpendicular to the direction, thereby changing the relative position.

12. The imaging method according to claim 11, wherein
in the provisional-imaging controlling step, the position of the solid-state imaging device with respect to the imaging optical system is shifted in the vertical direction, thereby changing the relative position.

* * * * *